May 10, 1966  E. BLONDIAU  3,250,074
MASTER CYLINDERS OF HYDRAULIC BRAKING SYSTEMS
Filed Sept. 14, 1964
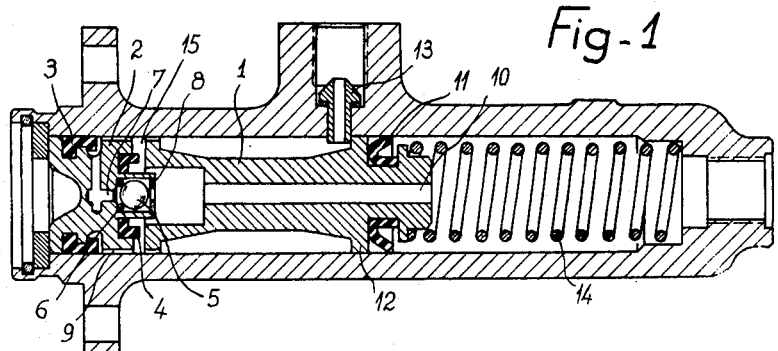
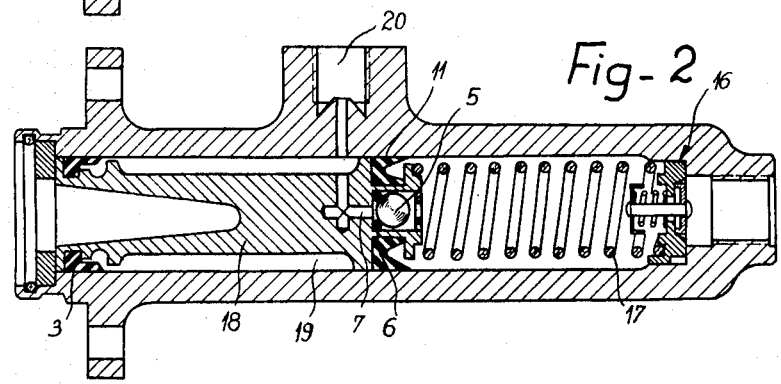
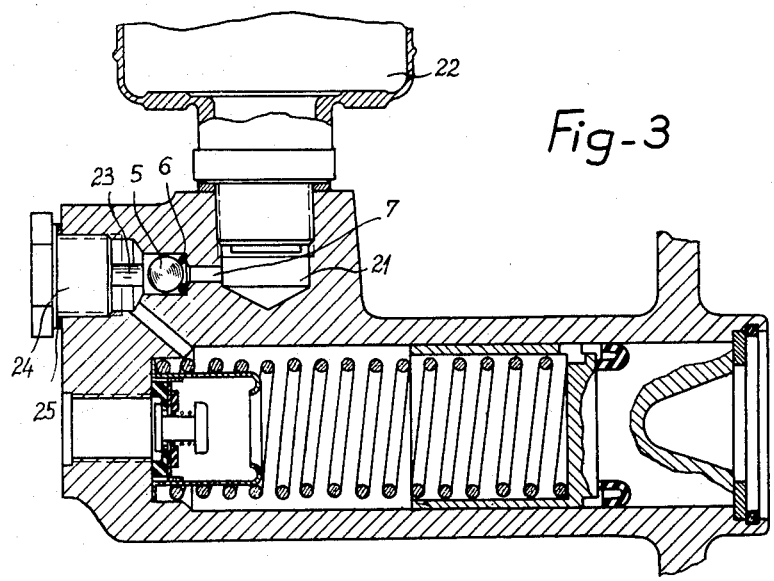
EDGARD BLONDIAU
INVENTOR United States Patent Office 3,250,074
Patented May 10, 1966

3,250,074
MASTER CYLINDERS OF HYDRAULIC BRAKING SYSTEMS
Edgard Blondiau, Saint-Ouen, France, assignor to Stop, Saint-Ouen, France, a corporation of France
Filed Sept. 14, 1964, Ser. No. 396,099
4 Claims. (Cl. 60—54.6)

This invention relates to hydraulic braking systems and has specific reference to master cylinders therefor.

At present fluid-free compensation is effected in master cylinders by:

(a) The provision of a small-diameter compensation orifice uncovered in the inoperative position of the piston;

(b) The provision of a suction valve mechanically controlled by the piston in the inoperative position thereof;

(c) The provision of a sealing ring of which the shape is altered by the pressure of the piston return spring, without any possible compensation due to the spring action during the return stroke of the piston.

These arrangements are attended by the following inconveniences:

(i) In disc-brake hydraulic control systems the main or master cup is subjected to a relatively high pressure at the compensation orifice, hence the rapid wear of the cup which is somewhat sheared by the compensation orifice; moreover, the available pressure stroke is reduced due to the necessity of positioning the compensation orifice about .04" from the edge of the lip of the master cup;

(ii) The available pressure stroke is further reduced by the necessity of releasing the shank of the rocking valve for opening the feed duct;

(iii) The available pressure stroke is reduced also on account of the necessity of mounting a calibrated spring of adequate force for compressing the sealing cup or ring packing;

(iv) It is imperative to equip the master cylinder with a residual-pressure check valve to prevent the ingress of air by suction into the wheel brake cylinders because in the above-mentioned systems downstream feed can take place only by: radial deformation of the master cup, unseating of the rocking valve controlled by a return spring, or releasing the sealing ring or packing;

(v) In disc brake systems the residual pressure produced by the bottom valve of the master cylinder should be reduced to zero upon completion of the pressure stroke to avoid a permanent engagement between the brake shoes and the wheel discs.

It is the essential object of this invention to eliminate or at least minimize these inconveniences and notably to obtain a free compensation by using simple, sturdy and reliable means involving but a minimum loss of pressure stroke.

With this object in view the present invention provides a master cylinder for hydraulic braking system which comprises a piston slidably mounted in a cylinder body, a chamber formed in said body ahead of said piston and adapted to communicate under certain conditions with a fluid compensation reservoir, this master cylinder being characterized in that said communication is obtained via a duct provided with a check valve having a freely-mounted valve member normally allowing said fluid compensation reservoir to communicate with said pressure chamber and becoming seated under the dynamic influence of said fluid when pressure develops in said chamber.

Various forms of embodiment of the compensation master-cylinder according to this invention will be described hereinafter by way of example with reference to the accompanying drawing, in which:

FIGURE 1 is a diagrammatic axial section showing a first form of embodiment of the master-cylinder, and FIGURES 2 and 3 are similar views showing alternate forms of embodiment of the master-cylinder of this invention.

Referring first to the exemplary form of embodiment illustrated in FIGURE 1, the cylinder body has slidably mounted therein a master-cylinder piston 1 and a free control piston 2 disposed behind said piston 1.

The free control piston 2 carries a conventional sealing cup 3 not subjected to the cylinder high pressure. It also carries on its face adjacent to the master piston 1 a retained sealing ring 4 of resilient material adapted to meet this requirement and to bear against the master piston 1 during the forward or operative stroke of control piston 2.

The free control piston 2 further carries centrally of its face adjacent to the master piston 1 a check valve consisting of a ball or like movable valve member 5 having its pressure seat made partially of a ring 6 of rubber or any other suitable elastic material, this ring 6 being prevented from undergoing a deformation exceeding a predetermined limit by the engagement of said ball 5 or other like movable valve member with the bevelled edge of the compensation orifice constituting a rigid seat at the end of a duct 7 opening ahead of said sealing cup 3.

On the pressure side the permissible stroke of ball 5 is limited by a notched ring 8 closing the ball cavity.

The front portion of control piston 2 has axial passages 9 formed in its outer periphery to permit the flow of fluid in the direction of the compensation orifice 7.

The master piston 1 independent of control piston 2 consists of a cylindrical body formed with a longitudinal central duct 10 opening ahead of the master cup 11. Behind the master cup 11 the piston 1 is formed with a circular rib or retainer flange having the dual function of master-cup retainer and stop member for limiting the backward or inoperative stroke of the piston by engagement of a fixed pin or stud 13.

In this specific form of embodiment the fixed pin or stud 13 is hollow and acts at the same time as a cone nipple for connecting the master cylinder to the fluid compensation reservoir (not shown).

The master piston 1 is responsive to a return spring 14 reacting against the bottom of the master cylinder.

FIGURE 1 shows the component elements of the master cylinder in their inoperative positions. The master cylinder operates as follows:

When the brake pedal is depressed and the thrust thereof applied to the control piston 2, this piston bears with its sealing ring 4 against the rear face of piston 1, the shape of this ring 4 being altered until the two pistons contact each other.

The possible ingress of brake fluid through chamber 15 is prevented and the pressure created by the forward or operative stroke of piston 1 driven by control piston 2 causes the ball 5 to be seated on its elastic ring 6, thus closing the duct 7 also leading to chamber 15.

As the pressure increases the ball 5 crushes the ring 6 and eventually engages the rigid seat formed by the bevelled edge of the inlet end of duct 7. Thus the deformation or crushing of ring 6 is limited and this ring will have a longer useful life.

As the two pistons now form an integral, fluid-tight unit, the high pressure can be developed in the brake fluid.

As the braking effort is released from control piston 2 the return spring 14 urges both pistons to their inoperative positions as shown in the figure. If during the return stroke a suction is produced on the downstream side of cup 11 the ball 5 will be unseated to permit the ingress of fluid, and this fluid will flow through the tandem pistons along ducts 7 and 10.

As the master piston 1 engages the rear stop 13, control piston 2 is separated from piston 1 and thus any fluid pressure is removed from the complete hydraulic brake system.

In case of technical necessity the master cylinder may be provided with a conventional residual-pressure retaining valve (not shown) disposed for example in the bottom of the cylinder and responsive to the return spring 14.

A simplified form of embodiment of the invention described hereinabove is illustrated in FIGURE 2 showing a master cylinder designed with a view to provide a permanent residual pressure by means of the conventional valve unit 16 engaged by the return spring 17 controlling the residual pressure and constantly urging the one-piece piston 18 to its inoperative position, this piston 18 having a master cup 11 of the type disclosed hereinabove and also a secondary cup 3 corresponding to the cup 3 of FIGURE 1.

This piston 18 has a duct 7 formed therein which leads into the inlet chamber 19 communicating with the fluid compensation reservoir (not shown) via the orifice 20.

The piston 18 carries the ball valve 5 and elastic ring 6 having the same functions as in the preceding case.

According to the basic principle of this master cylinder any vacuum developing downstream of cup 11 entails an automatic compensation by unseating the ball valve 5 from its seat 7 and ring 6.

Upon completion of the return stroke of the piston the ball valve 5 having been subjected to a certain vacuum will remain by inertia in a position opening the compensation duct 7.

FIGURE 3 illustrates a modified arrangement wherein the valve assembly comprising the ball 5, sealing ring 6 and the seat at the outlet of duct 7 are not fitted on the piston proper but somewhat spaced therefrom. In this alternate form of embodiment the duct 7 leads directly into the feed chamber 21 of reservoir 22 and at the front end of the pressure chamber of the master cylinder.

The ball and sealing ring assembly 5, 6 is mounted in the cylinder portion constituting the reservoir support, but this disposal is purely exemplary and any other suitable location of the cylinder which communicates with the pressure chamber thereof, in the horizontal position, may be selected. The stroke of ball 5 is limited by a stop 23 carried by the fluid-tight plug 24 provided with a gasket 25.

This arrangement of the ball valve 5 is independent of the conventional master-cylinder piston. This valve assembly is also easily accessible from outside the master cylinder, this feature being particularly interesting since the operation of the compensation valve unit may be checked without removing the essential internal component elements of the master cylinder.

In all the forms of embodiment shown and described herein the loss of pressure stroke of the master piston is reduced to a very small value corresponding simply to the displacement of the moderate fluid volume necessary for moving the ball 5 to its position of engagement firstly with ring 6 and then with seat 7.

The ball 5 is free and in spite of its limited permissible movement the cross-sectional area available for the compensation fluid is considerably greater than in the above-mentioned conventional arrangements.

I claim:
1. A master cylinder for a hydraulic braking system comprising a pair of pistons adapted to move within said cylinder, spring means within said cylinder for normally urging both said pistons to their inoperative positions, a first of said pistons having an axial fluid passage therethrough, the second of said pistons having a radial fluid passage therethrough, said second piston having at the end adjacent said first piston, a check valve and a fluid-tight seal, said valve being of the type adapted to produce a low pressure seal at low pressure differentials in the partially closed position and a high pressure seal in the fully closed position thereof, a fluid reservoir chamber normally in communication with the axial fluid passage through said first piston, said second piston adapted upon application of braking force thereto, to be urged against said first piston thereby to seal its said axial fluid passage from said reservoir and to present a high pressure fluid-tight seal enabling said first piston to develop the required hydraulic pressure at the output end of said cylinder.

2. A master cylinder as claimed in claim 1, further comprising a stop member for limiting the axial movement of said first piston in its inoperative position, thereby ensuring separation of said pistons when braking force against said second piston is released.

3. A master cylinder as claimed in claim 1, further comprising a pair of additional fluid-tight seals disposed at the distant ends of said respective pistons.

4. A master cylinder as claimed in claim 1, wherein the axial fluid passage through said first piston has a portion sufficiently large to allow recessing of said valve therein in the operative position.

References Cited by the Examiner

UNITED STATES PATENTS

| | | | |
|---|---|---|---|
| 2,262,843 | 11/1941 | Goepfrich | 60—54.6 |
| 3,009,476 | 11/1961 | Usab | 137—516.29 |

FOREIGN PATENTS

| | | |
|---|---|---|
| 1,100,456 | 4/1955 | France. |
| 444,781 | 3/1936 | Great Britain. |

SAMUEL LEVINE, *Primary Examiner.*

ROBERT R. BUNEVICH, *Examiner.*